(12) United States Patent
Eckhoff et al.

(10) Patent No.: US 9,371,854 B2
(45) Date of Patent: Jun. 21, 2016

(54) RADIAL ROLLER BEARING ARRANGEMENT, IN PARTICULAR FOR A NEEDLE BUSHING

(71) Applicants: Nils Eckhoff, Erlangen (DE); Alexander Pabst, Erlangen (DE); Frank Schönstein, Baiersdorf (DE)

(72) Inventors: Nils Eckhoff, Erlangen (DE); Alexander Pabst, Erlangen (DE); Frank Schönstein, Baiersdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 13/656,199

(22) Filed: Oct. 19, 2012

(65) Prior Publication Data

US 2013/0170779 A1    Jul. 4, 2013

(30) Foreign Application Priority Data

Dec. 16, 2011   (DE) .......................... 10 2011 088 868

(51) Int. Cl.
| | | |
|---|---|---|
| *F16C 33/34* | (2006.01) | |
| *F16C 19/44* | (2006.01) | |
| *F16C 35/067* | (2006.01) | |
| *F16C 19/46* | (2006.01) | |
| *F16C 33/58* | (2006.01) | |

(52) U.S. Cl.
CPC ............... *F16C 19/44* (2013.01); *F16C 19/466* (2013.01); *F16C 33/588* (2013.01); *F16C 35/067* (2013.01); *F16C 2361/61* (2013.01)

(58) Field of Classification Search
CPC ...... F16C 19/44; F16C 19/466; F16C 35/067; F16C 33/588; F16C 2361/61
USPC .......................... 384/569, 585, 584, 906, 564
See application file for complete search history.

(56) References Cited

U.S. PATENT DOCUMENTS

| | | | | |
|---|---|---|---|---|
| 5,419,641 | A * | 5/1995 | Fujinami et al. ............... | 384/470 |
| 5,846,001 | A * | 12/1998 | Muntnich et al. ............. | 384/620 |
| 2004/0096132 | A1* | 5/2004 | Grehn et al. ................... | 384/494 |
| 2009/0136169 | A1* | 5/2009 | Katayama et al. ............ | 384/457 |
| 2009/0154858 | A1* | 6/2009 | Horvat ........................... | 384/513 |
| 2010/0303397 | A1 | 12/2010 | Draser et al. .................. | 384/572 |

FOREIGN PATENT DOCUMENTS

| | | | | |
|---|---|---|---|---|
| CN | 101680480 | | 3/2010 | ............. F16C 19/46 |
| DE | 10123965 A1 | | 11/2002 | |

\* cited by examiner

*Primary Examiner* — Marcus Charles
*Assistant Examiner* — Yamilka Pinero Medina
(74) *Attorney, Agent, or Firm* — Fitzpatrick, Cella, Harper & Scinto

(57) ABSTRACT

A radial roller bearing arrangement in which at least one retaining projection is provided as an anti-rotation feature of an outer ring. The projection is located on an inner diameter of a fixed rim formed on one axial side of the outer ring, so that the outer ring can be implemented with a radially inward-pointing flanged rim on its other axial side that can be formed after insertion of a needle roller and cage assembly to act for holding the needle roller and cage assembly in the outer ring.

6 Claims, 2 Drawing Sheets

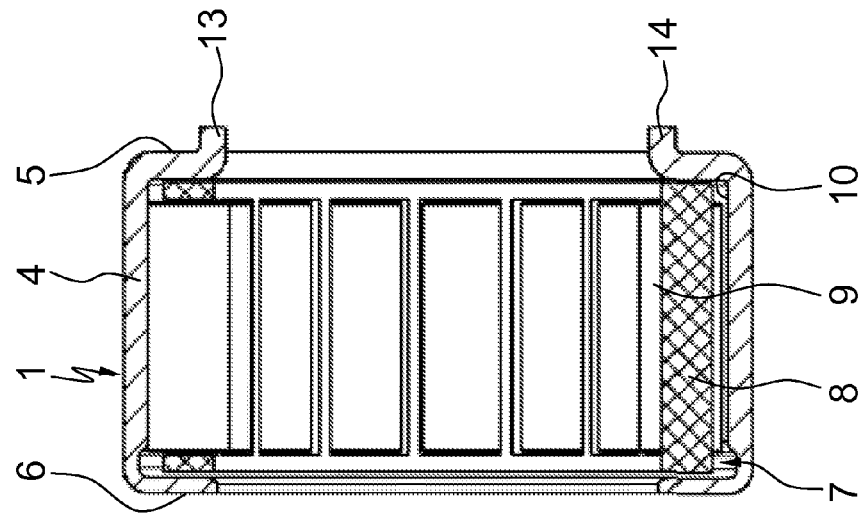
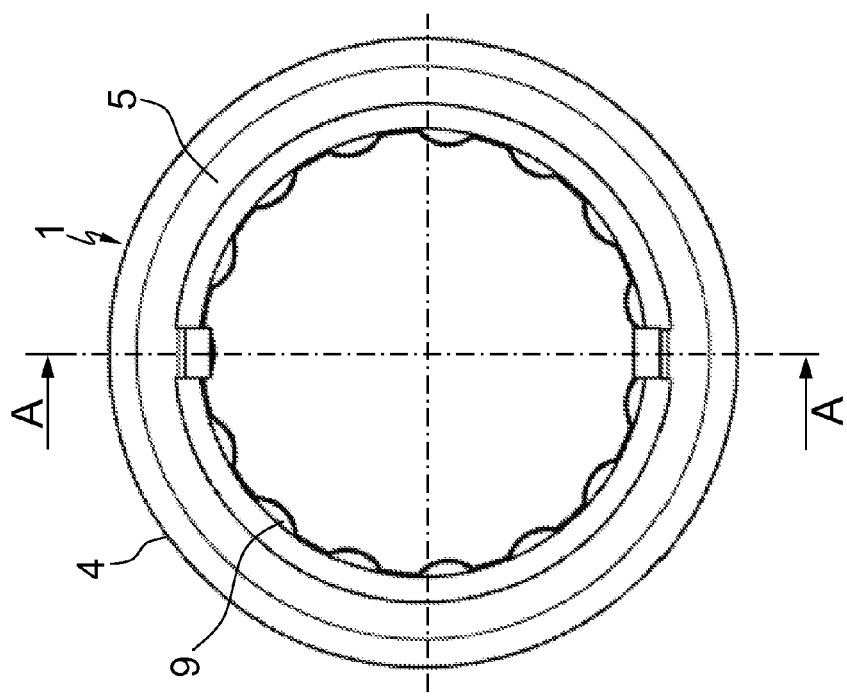

RADIAL ROLLER BEARING ARRANGEMENT, IN PARTICULAR FOR A NEEDLE BUSHING

FIELD OF THE INVENTION

The invention concerns a radial roller bearing arrangement, which can be implemented to particular advantage by means of needle bushings in the bearings of countershafts in manual transmissions or dual-clutch transmissions in motor vehicles.

BACKGROUND OF THE INVENTION

It is generally known in the field of roller bearings that needle bushings are the form of needle bearing that have the smallest radial overall height and permit especially space-saving and easy-to-install bearings with high radial load capacity. Such needle bearings are known, for example, from the applicant's "Roller Bearings" catalog, October 2008 edition on pages 681 to 697, and are used as an economical alternative to cylindrical roller bearings, including in the bearings of countershafts in manual transmissions or dual-clutch transmissions in motor vehicles. However, because these needle bushings have a thin-walled outer ring that is formed from sheet steel without cutting and is pressed into a bore in a transmission housing consisting of a light metal, a loose seating of the needle bushing occurs when the temperature rises during motor vehicle operation on account of the different coefficients of thermal expansion. Aluminum and magnesium, the customary materials for a transmission housing, have coefficients of thermal expansion more than twice as high as that of the steel used for the outer ring, so that the bore in the transmission housing provided as the bearing seat enlarges faster than the outer ring of the needle bushing. The result is a rotation of the outer ring along with the supported shaft, which results in increased wear and inaccuracies in the bearing seat, and ultimately to failure of the needle bushing and damage to the transmission.

Attempts were made in the prior art to remedy these disadvantages by means of a needle bushing that likewise consists of a thin-walled outer ring that is formed without cutting and can be inserted into a bore in a housing but has on only one axial side a thin-walled outer ring with a radially inward-pointing fixed rim, and also consists of a needle roller and cage assembly that is inserted into the outer ring and that is composed of a needle cage and a plurality of bearing needles guided with uniform circumferential spacing therein and rolling on the inner circumferential surface of the outer ring and on the outer circumferential surface of the shaft to be supported or on a separate inner ring. On its other axial side, multiple uniformly spaced retaining projections extending radially away from the outer ring have been formed on the outer ring; the retaining projections were inserted in corresponding grooves in the housing and thus constituted an anti-rotation feature of the outer ring. For manufacturing reasons, however, due to these retaining projections it was no longer possible to form the radially inward-facing flanged rim that is otherwise customary on this axial side of the outer ring and that holds the needle roller and cage assembly in the outer ring.

Therefore, multiple uniformly spaced retaining claws that engaged around the fixed rim of the outer ring were formed on the axial side of the needle cage facing the fixed rim in order to prevent the needle roller and cage assembly from moving out the other axial side of the outer ring.

However, in practice it has been shown that such retaining claws on the needle cage are unsuitable for retaining the needle cage in the outer ring over the full service life, since they tend to break off when axial forces arise in bearing operation. Consequently, DE 101 23 965 A1 proposed to implement retention of the needle cage in the outer ring by means of an additional annular thrust washer that is designed with special retaining tabs on its outer circumference corresponding to the outer diameter of the outer ring; these retaining tabs are present in the same number and arrangement as the retaining projections on the outer ring, and are placed on the open axial side of the outer ring to form a second radially inward-facing rim. The thrust washer is then attached to the retaining projections of the outer ring using the retaining tabs, and is pressed into the bearing seat together with the needle bushing.

However, the formation of a second rim on the needle bushing with an additional thrust washer of this nature has also proven to be disadvantageous, since additional costs arise in its production and assembly. Moreover, it has been shown that the bending of the radial retaining projections on the outer ring gives rise to inhomogeneities in the inner race for the rolling elements formed by the inner circumferential surface of the outer ring, since these retaining projections act as stiffeners on the inner race under heavy load. The regions of the race located directly adjacent to the projections are then considerably more elastic again, resulting in local stress peaks and uneven load distribution in the race due to the rolling elements that roll over these regions. In like manner, the bent retaining projections result in geometric deviations that extend into the race for the rolling elements and thereby adversely affect the load capacity of the needle bushing.

OBJECT OF THE INVENTION

Proceeding from the described disadvantages of the known state of the art, therefore, the object of the invention is to design a radial roller bearing arrangement, in particular for a needle bushing, in which the needle bushing has an anti-rotation feature that avoids inhomogeneities and geometric deviations in the race for the rolling elements and is designed with economical means for holding the needle cage in the outer ring.

DESCRIPTION OF THE INVENTION

According to the invention, this object is attained in a radial roller bearing arrangement in such a manner that the at least one retaining projection provided as an anti-rotation feature of the outer ring is located on the inner diameter of the fixed rim formed on one axial side of the outer ring, so that the outer ring can be designed to have a radially inward-pointing flanged rim on its other axial side that can be formed after insertion of the needle roller and cage assembly to act as means for holding the needle roller and cage assembly in the outer ring.

Preferred embodiments and advantageous refinements of the radial roller bearing arrangement designed according to the invention are described throughout the description below.

Accordingly, another example aspect of the invention is that provision is made in the radial roller bearing arrangement designed according to the invention that retaining projections, preferably two in number located offset 180° from one another, are formed on the inner diameter of the fixed rim of the outer ring and extend axially away from the fixed rim. Two axial retaining projections located at the inner diameter of the fixed rim of the outer ring has proven to be an adequate number as an anti-rotation feature for the outer ring; however, it is also possible to form only one retaining projection or more than two retaining projections on the fixed rim of the outer ring.

A further example aspect of the invention is that the radial roller bearing arrangement designed according to the invention that the two retaining projections preferably have a rectangular shape and are formed without cutting on the fixed rim of the outer ring at the same time that the outer ring is formed without cutting. Such a shape of the retaining projections has proven to be the simplest to produce for manufacturing reasons; however, a pin-like design of the retaining projections would also be possible.

A further example aspect of the invention is that the retaining projections as an anti-rotation feature for the outer ring stand in operative connection with two locating bores located in the bore of the housing opposite the retaining projections. The diameter of the locating bores in this design is slightly larger than the width of the retaining projections, both to facilitate installation of the needle bushing in the housing and to keep the rotational play as small as possible.

Lastly, as an advantageous implementation of the radial roller bearing arrangement the flanged rim provided as the means for retaining the needle roller and cage assembly in the outer ring has a lesser material cross-section than the fixed rim, wherein the lesser material cross-section of the flanged rim is produced without cutting by roll forming, and the flanged rim is flanged inward into its radially inward-pointing position by roll flanging.

The radial roller bearing arrangement designed according to the invention thus has the advantage as compared to radial roller bearing arrangements known from the prior art that the retaining projections provided as an anti-rotation feature for the outer ring of the needle bushing are located at the inner diameter of the fixed rim formed on one axial side of the outer ring, and thus cause no inhomogeneities in the race for the rolling elements formed by the inner circumferential surface of the outer ring and no geometric deviations that adversely affect the load capacity of the needle bushing. Moreover, as a result of the novel arrangement of the retaining projections, a radially inward-pointing flanged rim that can be formed after insertion of the needle roller and cage assembly, and with which the needle roller and cage assembly can be retained in the outer ring in an economical manner, can now be arranged on the other axial side of the outer ring.

BRIEF DESCRIPTION OF THE DRAWINGS

A preferred embodiment of the radial roller bearing arrangement designed in accordance with the invention is described in detail below with reference to the attached drawings. Shown are:

FIG. 2 a side view of the needle bushing of the radial roller bearing arrangement designed in accordance with the invention;

FIG. 3 the section A-A through the needle bushing of the radial roller bearing arrangement designed in accordance with the invention.

DETAILED DESCRIPTION OF THE DRAWINGS

Figure 1:
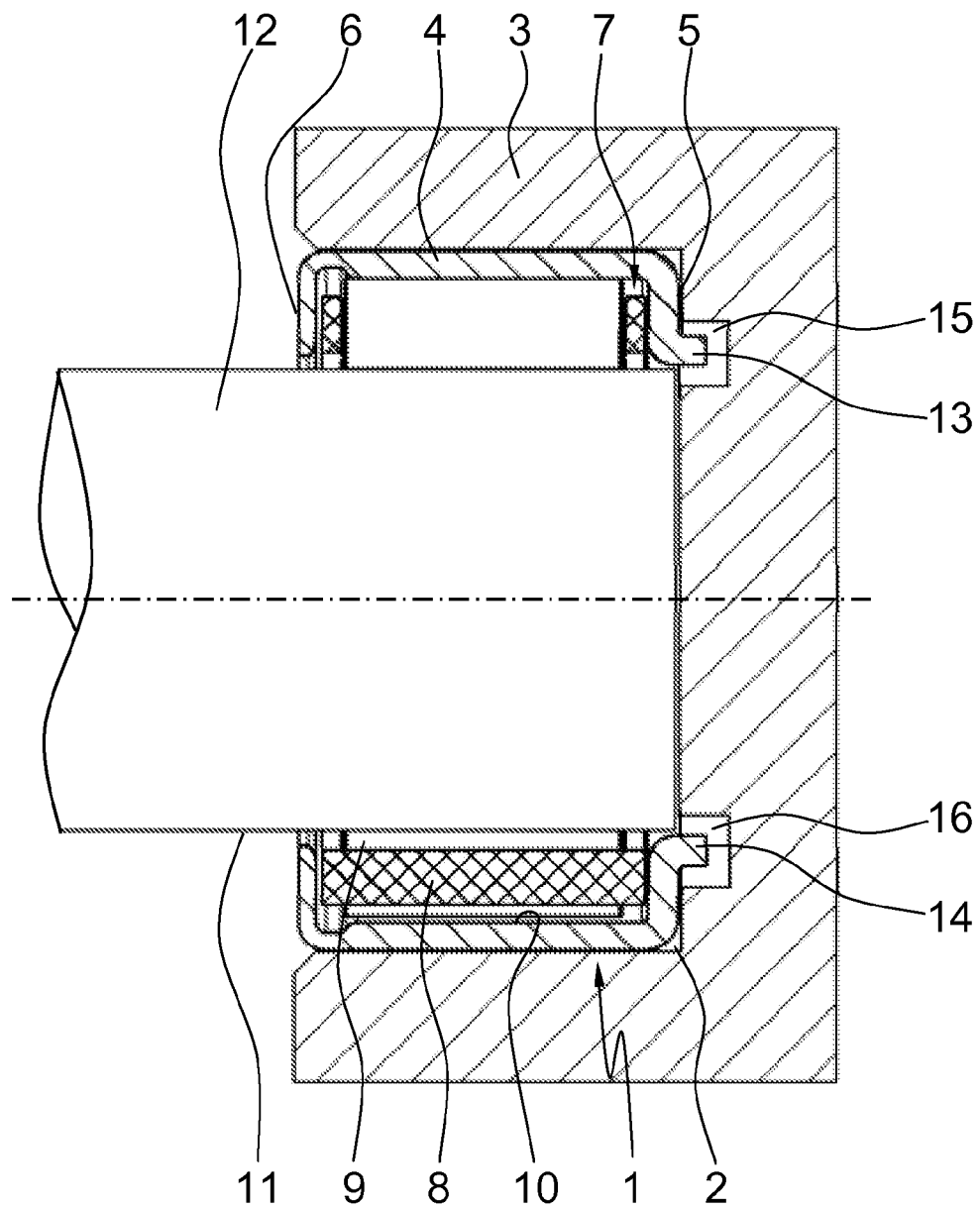
FIG. 1 a cross-sectional view of a radial roller bearing arrangement designed in accordance with the invention by means of a needle bushing.

Evident in FIG. 1 is a radial roller bearing arrangement for a needle bushing 1 consisting essentially of a thin-walled outer ring 4 that is formed without cutting and is placed in a bore 2 of a housing 3, and also consisting of a needle roller and cage assembly 7 placed in the outer ring 4. It is clearly evident that on one axial side the outer ring 4 in this design has a radially inward-pointing fixed rim 5, which is formed without cutting on the outer ring 4 together with the forming of the ring without cutting. Also clearly visible in FIG. 1 is that the needle roller and cage assembly 7 is composed, in a known manner, of a needle cage 8 and a plurality of bearing needles 9 that are guided therein in the circumferential direction with uniform spacing and that roll on the inner circumferential surface 10 of the outer ring 4 and on the outer circumferential surface 11 of a shaft 12 that is to be supported.

Moreover, it can be seen from FIGS. 1 through 3 that as an anti-rotation feature for the outer ring 4, the needle bushing 1 has two retaining projections 13, 14 located offset 180° from one another that engage the housing 3, and in a manner according to the invention said retaining projections are located on the inner diameter of the fixed rim 5 formed on one axial side of the outer ring 4 and extend axially away from the fixed rim 5. It is evident from FIG. 2 here that the two retaining projections 13, 14 have a rectangular shape and are formed without cutting on the fixed rim 5 of the outer ring 4 at the same time that the outer ring is formed without cutting. Moreover, it is evident from FIG. 1 that the retaining projections 13, 14 as an anti-rotation feature for the outer ring 4 stand in operative connection with two locating bores 15, 16 located in the bore 2 of the housing 3 opposite the retaining projections 13, 14, the diameter of said locating bores being slightly larger than the width of the retaining projections 13, 14.

Lastly, it is also evident from FIGS. 1 and 3 that as a result of the arrangement of the retaining projections 13, 14 on the fixed rim 5 of the outer ring 4, it is now additionally possible in a manner according to the invention to provide the outer ring 4 with a radially inward-pointing flanged rim 6 on its other axial side that can be formed after insertion of the needle roller and cage assembly 7 to act as means for holding the needle roller and cage assembly 7 in the outer ring 4. As is clearly evident, this flanged rim 6 has a lesser material cross-section than the fixed rim 5, wherein the lesser material cross-section thereof is produced without cutting by roll forming, and the flanged rim 6 is flanged inward into its radially inward-pointing position by roll flanging.

LIST OF REFERENCE NUMBERS 1 needle bushing
2 bore in 3
3 housing
4 outer ring of 1
5 fixed rim on 1
6 flanged rim on 1
7 needle roller and cage assembly of 1
8 needle cage of 7
9 bearing needles of 7
10 inner circumferential surface of 4
11 outer circumferential surface of 12
12 shaft
13 bearing projection on 5
14 bearing projection on 5
15 locating bore in 3
16 locating bore in 3

The invention claimed is:
1. A radial roller bearing for a needle bushing, the radial roller bearing comprising:
an uncut outer ring that can be placed in a bore of a housing, the outer ring comprising a single, unitary ring member comprising a first and second axial side, and an inner and outer circumferential surface, wherein the outer ring includes (a) on the first axial side, a radially inward-pointing fixed rim, (b) at least one retaining projection, and (c) on the second axial side, a radially inward-pointing flanged rim; and a needle roller and cage assembly that is placed inside of and surrounded by the outer ring and that is composed of a needle cage having a plurality of bearing needles guided therein in a circumferential direction with uniform spacing, where the plurality of bearing rollers roll on the inner circumferential surface of the outer ring and on an outer circumferential surface of either a shaft that is to be supported or a separate inner ring, wherein the at least one retaining projection is in at least one circumferential location of the needle bushing, and engages the housing as an anti-rotation feature of the outer ring, and the at least one retaining projection is located on an inner diameter of the fixed rim formed on the first axial side of the outer ring, so that the outer ring can be implemented with the radially inward-pointing flanged rim on the second axial side of the outer ring, and the radially inward-pointing flanged ring can be formed after insertion of the needle roller and cage assembly to hold the needle roller and cage assembly in the outer ring.

2. The radial roller bearing according to claim 1, further comprising two retaining projections located offset 180° from one another, said two retaining projections being formed on the inner diameter of the fixed rim, such that the retaining projections are formed on the first axial side of the outer ring, and said two retaining portions extending axially away from the fixed rim.

3. The radial roller bearing according to claim 2, wherein the two retaining projections have a rectangular shape and are formed without cutting on the fixed rim of the outer ring at the same time that the outer ring is formed.

4. The radial roller bearing according to claim 3, wherein the retaining projections provide an anti-rotation feature for the outer ring in operative connection with two locating bores located in the bore of the housing opposite the retaining projections.

5. The radial roller bearing according to claim 1, wherein the flanged rim retaining the needle roller and cage assembly in the outer ring has a cross-section that is smaller than that of the fixed rim.

6. The radial roller bearing according to claim 5, wherein the cross-section of the flanged rim is produced without cutting by roll forming and the flanged rim is flanged inwardly into its radially inward-pointing position by roll flanging.

* * * * *